(12) United States Patent
Peres

(10) Patent No.: US 11,572,451 B2
(45) Date of Patent: Feb. 7, 2023

(54) SCUFF RESISTANT DECORATIVE SURFACE COVERINGS

(71) Applicant: TARKETT GDL, Lentzweiler (LU)

(72) Inventor: Richard Peres, Wiltz (LU)

(73) Assignee: TARKETT GDL, Lentzweiler (LU)

( * ) Notice: Subject to any disclaimer, the term of this patent is extended or adjusted under 35 U.S.C. 154(b) by 1021 days.

(21) Appl. No.: 16/317,705

(22) PCT Filed: Jul. 12, 2017

(86) PCT No.: PCT/EP2017/067588
§ 371 (c)(1),
(2) Date: Jan. 14, 2019

(87) PCT Pub. No.: WO2018/011288
PCT Pub. Date: Jan. 18, 2018

(65) Prior Publication Data
US 2020/0181343 A1    Jun. 11, 2020

(30) Foreign Application Priority Data

Jul. 15, 2016  (EP) ..................................... 16179655

(51) Int. Cl.
*C08J 7/12*    (2006.01)
*C09D 7/40*    (2018.01)
(Continued)

(52) U.S. Cl.
CPC ............... *C08J 7/123* (2013.01); *C08J 7/043* (2020.01); *C08J 7/046* (2020.01); *C08J 7/0427* (2020.01); *C09D 7/61* (2018.01); *C09D 7/69* (2018.01); *C09D 7/70* (2018.01); *C09D 163/00* (2013.01); *C09D 167/08* (2013.01); *C09D 175/08* (2013.01); *E04F 15/02172* (2013.01); *E04F 15/102* (2013.01); *E04F 15/107* (2013.01);
(Continued)

(58) Field of Classification Search
CPC ............. E04F 15/02172; C09D 163/00; C09D 167/08; C09D 175/08; C08D 7/69; C08D 7/71
See application file for complete search history.

(56) References Cited

U.S. PATENT DOCUMENTS

| 4,405,657 A | 9/1983 | Miller, Jr. et al. |
| 5,401,560 A | 3/1995 | Williams |

(Continued)

FOREIGN PATENT DOCUMENTS

| EP | 1264035 B1 | 10/2003 |
| WO | 2017009066 A1 | 1/2017 |

OTHER PUBLICATIONS

International Search Report for International Application No. PCT/EP2017/067588, International Filing Date Jul. 12, 2017, dated Oct. 4, 2017, 4 pages.
(Continued)

*Primary Examiner* — Kregg T Brooks
(74) *Attorney, Agent, or Firm* — Cantor Colburn LLP

(57) ABSTRACT

The present invention is related to decorative surface coverings, in particular floor or wall coverings, comprising one or more layer(s) and a cured top-layer, combining excellent anti-slip properties and scuff resistance. The invention is further related to a method for the preparation of said surface coverings.

16 Claims, 2 Drawing Sheets

(51) Int. Cl.
   *C09D 7/61*    (2018.01)
   *C08J 7/04*    (2020.01)
   *C08J 7/046*   (2020.01)
   *C09D 163/00*  (2006.01)
   *C09D 167/08*  (2006.01)
   *C09D 175/08*  (2006.01)
   *E04F 15/02*   (2006.01)
   *E04F 15/10*   (2006.01)
   *C08J 7/043*   (2020.01)

(52) U.S. Cl.
   CPC ........ *C08J 2327/06* (2013.01); *C08J 2463/00* (2013.01); *C08J 2467/08* (2013.01); *C08J 2475/08* (2013.01)

(56) References Cited

U.S. PATENT DOCUMENTS

| | | |
|---|---|---|
| 5,458,953 A | 10/1995 | Wang et al. |
| 6,476,108 B1 | 11/2002 | Mogi et al. |
| 9,663,957 B2 | 5/2017 | Welton et al. |
| 2004/0234772 A1 | 11/2004 | Shortland et al. |
| 2010/0092745 A1* | 4/2010 | Welton .................. C08L 27/12 428/217 |
| 2018/0297336 A1 | 10/2018 | Fascella |

OTHER PUBLICATIONS

Written Opinion for International Application No. PCT/EP2017/067588, International Filing Date Jul. 12, 2017, dated Oct. 4, 2017, 8 pages.

\* cited by examiner

SCUFF RESISTANT DECORATIVE SURFACE COVERINGS

CROSS REFERENCE TO RELATED APPLICATIONS

This application is a National Stage application of PCT/EP2017/067588, filed Jul. 12, 2017, which claims the benefit of prior filing and priority to European Application No. 16179655.2, filed Jul. 15, 2016, both of which are incorporated herein by reference in their entirety.

FIELD OF THE INVENTION

The present invention is related to decorative floor and wall coverings comprising a topcoat showing improved anti-slip properties and scuff-resistance. The invention is further related to a method for the production of said surface coverings.

STATE OF THE ART

Surface covering materials, and especially surface covering materials adapted for use as floor and wall coverings, must frequently possess a wide range of sometimes contradictory properties and characteristics. For example, there has been an increasing demand for floor covering materials having improved scuff resistance. Furthermore, it is highly desirable for such floor covering materials to possess satisfactory anti-slip properties.

The term "scuff resistance" designates the ability of the wear surface to resist plastic flow when subjected to the force and frictional heat caused by the dragging of, for example, rubber or plastic soled shoes.

The term "slip-resistance" designates the ability of the wear surface to allow safe walking of a test person, the slope of said surface being increased from the initial horizontal state to the acceptance angle where the limit of safe walking is reached and the test person slips.

The current state of the art of floor covering materials presents either satisfactory anti slip properties or scuff resistance and relies primarily on the use of coating compositions, in particular polyurethane coating compositions, as topcoat.

U.S. Pat. No. 4,405,657 discloses a method of manufacturing a non-slip decorative plastic floor covering comprising:
(a) providing a plastic base as a liquid matrix, said liquid matrix comprising the liquid matrix a heat curable acrylated polyester;
(b) applying inorganic quartz particles in a preselected pattern to the plastic base, said particles having a particle size distribution comprised between 150 and 750 μm
(d) embedding said particles throughout the base material with the uppermost layer of particles protruding from the base material;
(e) curing the base material;
(f) applying an overall clear or translucent curable wear coating, comprising a urethane having pendent ethylenically unsaturated groups, to form a continuous film over the cured base material having the protruding particles; and
(g) curing the wear layer by exposure to ultraviolet light.

U.S. Pat. No. 5,401,560 relates to non-slip materials which are provided by coating a polymer sheet backing, preferably a polyvinyl chloride sheet, with mineral particles adhered to the backing by a radiation curable polyurethane binder material. The radiation cured polyurethane binder material is electron beam cured. A variety of mineral particles may be employed which will provide adequate frictional contact in use to prevent, or aid in the prevention of slippage. Examples of suitable mineral particles are aluminum oxide, silicon carbide, fumed silica and silica gel.

EP 1264035 discloses a method for producing an anti-slip floor covering comprising a plasticized PVC base structure, reinforced or not with a textile core, associated with a surface covering wherein are inlaid particles providing the assembly with anti-slip properties. The method comprises applying a thermosetting polyester based powder layer on a pre-gelled PVC plastisol layer and subjecting the whole to a heat treatment to form a homogeneous liquid layer; silicon carbide particles or the like then are applied on the liquid assembly, whereupon it is heat treated leading to complete gelling of the plastisol and crosslinking of the surface film.

U.S. Pat. No. 5,458,953 discloses a resilient surface covering meeting standards of stain, mar, scuff, and soil resistance, said resilient surface covering comprising (a) a resilient support surface and (b) a resilient wear surface adhered to said resilient support surface, said resilient wear surface comprising an underlying wear layer base coat and an overlying wear layer top coat adhered to said wear layer base coat, said wear layer top coat comprising a hard, thermoset, polymeric UV-curable blend of acrylic or acrylate monomers.

EP 1046688 discloses an aqueous coating composition comprising (A) an aqueous dispersing material which is a copolymer having a glass transition temperature 80° C. or less which is obtained by the copolymerization a specific unsaturated carboxylic acid, (meth)acrylic acid alkyl ester, and other monomers and (B) a specific aminoalcohol compound in a specific proportion. The aqueous coating composition, comprising a polyethylene wax, exhibit superior durability and water resistance which are represented by black heel mark resistance and anti-scuff properties. The composition is particularly useful as a floor coating material.

US 2004/0234772 discloses slip and marking-resistant floor coverings, comprising a low surface tension additive (e.g. a wax or silicone oil) in an amount suitable to improve resistance to marking without substantially decreasing the slip resistance. Generally the low surface tension additive is present in the upper layer of the flooring material. Where the flooring material comprises only base layer(s), the additive is present in the upper base layer. Where the flooring material comprises a coating layer forming an upper layer, the additive is preferably present only in the coating layer. The coating layer preferably includes a thermoplastic or a crosslinkable polymer or copolymer. For the crosslinkable polymer or copolymer, crosslinking may be effected by condensation or by a free radical route such as using UV radiation. Examples of suitable polymers or copolymers include polyvinylidene difluoride, a polyester, polyurethane, or acrylic polymer or copolymer, an epoxy resin, and/or an olefin/modified olefin copolymer. More preferably the coating portion includes an acrylic polymer. Most preferably the coating portion includes a mixture of an acrylic polymer with polyvinylidene difluoride.

The flooring material may include one or more of a number of types of hard particles including silicon carbide, a silica (e.g. quartz, a colored or natural sand or a flint), aluminium oxide and/or emery. The particulate material is preferably partially embedded in the base layer.

While decorative surface coverings showing both, a high degree of scuff-resistance and anti-slip properties, are extremely important especially for flooring materials, it is generally accepted that up till now surface coverings showing a high degree of anti-scuff properties exhibit poor anti-slip and vice versa.

AIMS OF THE INVENTION

The present invention aims, in a first aspect, at providing a decorative surface covering, in particular floor or wall covering, comprising one or more layer(s) made from a material chosen from polymer, mineral, wood or a combination thereof and a top-layer with good adhesion to the top of the surface layer of the one or more layer(s), said top-layer combining excellent scuff-resistance and anti-slip properties.

A further aim of the present invention is to provide, in a second aspect, a process for the production of said surface coverings.

SUMMARY OF THE INVENTION

The present invention discloses a decorative surface covering comprising one or more layer(s) comprising a material selected from the group consisting of polymer, mineral, wood and a combination thereof and a top-layer completely covering the top surface of the one or more layers, said decorative surface covering having a Slip Resistance, according to EN13893, corresponding to Slip Resistance Class equal to or superior to R9, preferably equal to or superior to R10, more preferably equal to or superior to R11 and a Scuff Resistance of 8 or higher, preferably of 10 or higher, more preferably of 12 or higher as assessed in a friction test apparatus with an Astral Rubber tool according to the method as disclosed in [0152] to [0155] of the detailed description.

Preferred embodiments of the present invention disclose one or more of the following features:
- the one or more layer(s) are polymer layers comprising polymers selected from the group consisting of polyvinyl halides, polyolefins and block copolymers comprising polymer blocks of one or more vinyl aromatic monomer(s) and polymer blocks of one or more alkylene(s);
- the top-layer comprises 40 to 80% by weight of a cured binder (i) comprising a polymer selected from the group consisting of epoxy resin, epoxy ester resin, vinyl ester resin, polyester, alkyd resin, polyamide, polyurethane, polyether, (meth)acrylate (co)polymer, vinyl (co)polymer, aminoplast resin and mixtures thereof;
- the top-layer comprises 0.5 to 25% by weight of one or more types of micro-scale particle(s) (ii) with a volume median particle diameter (D50) comprised between 1 and 50 µm, preferably between 3 and 35 µm, more preferably between 5 and 20 µm, as obtained from laser light scattering measurements according to ISO 13320;
- the top-layer comprises 0.1 to 20% by weight of one or more compounds (iii) selected from the group consisting of silicones, fluorocarbons, fluorinated silicones, olefin (co)polymers, natural waxes and synthetic waxes;
- the top-layer is a uniform layer or is patterned layer with patterns comprising micro-scale particles (ii) and patterns comprising compounds (iii).
- the types of one or more micro-scale particles (ii) are selected from the group consisting of glass particles, plastic particles, metal oxide particles, metalloid oxide particles and metal salt particles and mixings thereof;
- the average particle size of the micro-scale particles (ii) is comprised between 0.02 and 500%, preferably between 0.04 and 350%, more preferably between 0.06 and 200% and most preferably between 0.08 and 100% of the layer thickness surrounding said particles.
- the top-layer comprises acid functionalities selected from the group consisting of —$SO_3H$, —$OSO_3H$, —COOH, —$OPO_3H_2$ and —$OPO_2HO$—.
- the surface covering comprises a chemically or mechanically embossed textured and/or patterned structure;
- the surface covering comprises a patterned embossed structure, wherein the complete surface, i.e. the embossed and non-embossed regions, or only the non-embossed regions are covered with a top-layer comprising one or more compounds (iii); the embossed regions being covered with a top-layer comprising micro-scale particles (ii);
- the top-layer comprises:
  - 40 to 80% by weight of a cured binder comprising a polymer selected from the group consisting of polyurethane and epoxy resin;
  - 0.5 to 25% by weight of micro glass spheres;
  - 0.1 to 20% by weight of polysiloxane.

The present invention further discloses a process for the preparation of the decorative surface covering, comprising the steps of:
- providing one or more layer(s);
- applying at least one coating composition, as a continuous layer or according to overlapping or non-overlapping patterns, and completely covering the entire surface of the one or more layers, said coating composition being selected from the group consisting of coating compositions comprising binder (i) and micro-scale particles (ii), binder and one or more compounds (iii) and mixture thereof;
- curing the coating composition(s).

Preferred embodiments of the process for the preparation of said decorative surface covering disclose one or more of the following features:
- the coating composition is selected from the group consisting of solvent based, water-borne, high solid and powder compositions, the binder of each of said coating compositions being a one- or two-component binder system, said coating compositions being selected from the group consisting of coating compositions comprising, with respect to the non-volatile components,
  - 40 to 80% by weight of binder (i) and 0.5 to 25% by weight of one or more micro-scale particle(s) (ii);
  - 40 to 80% by weight of binder (i), and 0.1 to 20% by weight of one or more compounds (iii); and
  - 40 to 80% by weight of binder (i), 0.5 to 25% by weight of one or more micro-scale particle(s) (ii) and 0.1 to 20% by weight of one or more compounds (iii).
- the method comprises the additional step of mechanical embossing the one or more polymer layer(s) before application of the one or more coating composition(s) or before curing of the one or more coating application(s);
- the method comprises the additional step of subjecting the top surface of the one or more polymer layer(s) to a plasma treatment, preferably a corona plasma treatment, before application of the one or more coating composition(s);
- curing of the coating composition is performed by infrared irradiation, preferably short and medium infrared irradiation, more preferably a combination of short infrared followed by medium infrared.

DETAILED DESCRIPTION OF THE INVENTION

Figure 1:
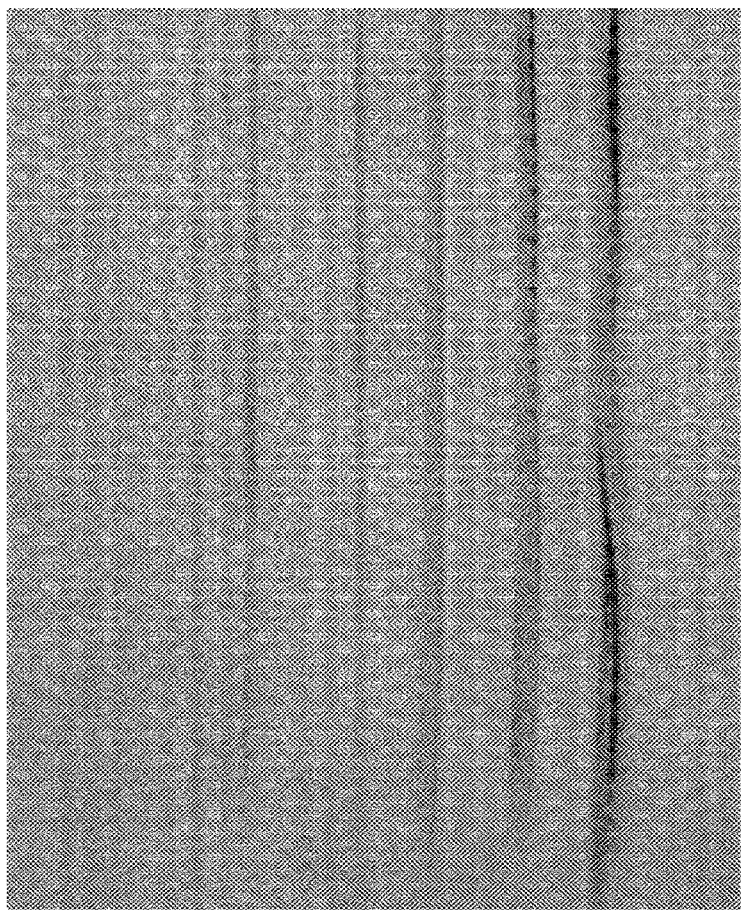
FIG. 1 illustrates the scuff resistance test on a decorative surface according to the state of the art.

An object of an aspect of the present invention is to provide decorative floor and wall coverings comprising a top-layer combining excellent scuff-resistance and anti-slip properties. Said top-layer is obtained from curing one or more coating composition(s) comprising one or more surface tension reducing component(s) and one or more microscale particle(s).
Said top-layer covers the top-surface of a substrate, said substrate comprising one or more layer(s) selected from the group consisting of polymer, natural wood, engineered wood, natural stone, agglomerated stone and ceramic.

In one embodiment the substrate of the decorative surface coverings of the present invention comprises a stack of layers, preferably comprising a backing layer, a decor layer, at least one wear layer all preferably comprising one or more olefin (co)polymers and/or one or more vinyl halide (co) polymers.

Additional layers can be present. The additional layers can be used for a variety of purposes, such as for reinforcement.

In another embodiment the substrate of the decorative surface coverings comprise one layer comprising one or more olefin (co)polymers and/or one or more vinyl halide (co)polymers.

The one or more polyolefin (co)polymers comprise one or more homo and/or copolymers selected from the group consisting of an ethylene homopolymer, a propylene homopolymer, an ethylene copolymer comprising alpha-olefins, an olefin copolymer comprising vinyl carboxylate esters, an olefin copolymer comprising alkyl (meth)acrylates, a polyolefin elastomer and a polar group comprising polyolefin.

The one or more vinyl halide (co)polymers are selected from the group consisting of polyvinyl chloride homopolymers, and copolymers of vinyl chloride and one or more ethylenically unsaturated monomers selected from the group consisting of vinylidene chloride, (meth)acrylic acid esters, α,β-unsaturated dicarboxylic acid esters, vinyl alkanoates, and alkylenes.

The one or more layer(s) further may comprise one or more styrene/olefin based elastomers.

The one or more layer(s) further may comprise organic or inorganic fillers, lubricants and additives.

The one or more layers optionally comprise(s) a primer layer and/or one or more prints.

The top-layer on the top surface of the one or more layer(s) may be obtained from curing of one or more coating composition(s), said coating compositions comprising:
  i. 40 to 90% by weight of a binder system;
  ii. 0.5 to 25% by weight of one or more types of micro-scale particle(s) with a volume median particle diameter (D50) comprised between 1 and 50 µm, preferably between 3 and 35 µm, more preferably between 5 and 20 µm;
  iii. 0.1 to 20% by weight of one or more compounds selected from the group consisting of silicones, fluorocarbons, fluorinated silicones, olefin (co)polymers, natural waxes and synthetic waxes.

By coating composition the present invention means solvent-borne, waterborne, high solid and powder compositions.

By curing the present invention means the transition from the liquid to the solid state through evaporation and/or chemical crosslinking.

By chemical crosslinking the present invention means oxygen crosslinking, moisture crosslinking, peroxide based radical crosslinking, and crosslinking through the reaction of co-reactable functional groups including self-condensation. In general the chemical crosslinking is temperature activated.

By thermally activated the present invention means that the conversion proceeds at room temperature or higher temperature within a reasonable time frame, compatible with the overall production process of the surface coverings.

By chemical crosslinking the present invention excludes crosslinking initiated by ultra violet (UV) or electron (EB) irradiation.

The binder of the coating composition of the present invention preferably comprises polymers selected from the group consisting of polyester, polyether, polyurethane, (meth)acrylate (co)polymer, vinyl alkanoate (co)polymer, (hydrogenated) bisphenol resin, novolac resin, epoxy ester resin, vinyl ester resin, polyamide, aminoplast resin, alkyd resin and mixtures thereof.

The polyesters for being used in the binder of the present invention in generally are hydroxyl functional polyesters, obtained from reaction of a molar excess of polyols on polyacids, or carboxyl functional polyesters obtained from reaction of a molar excess of polyacids on polyols.

Examples of polyols for being used in the polyesters of the present invention are ethylene glycol, 1,2-propylene glycol, 1,3-propylene glycol, 1,2-butanediol 1,3-butanediol, 1,4-butanediol, 1,5-pentanediol, neopentyl glycol, diethylene glycol, triethylene glycol, cyclohexane-dimethanol, glycerol, trimethylolethane, trimethylolpropane and tris-2-hydroxyethyl isocyanurate, Examples of polyacids for being used in the polyesters of the present invention are phthalic acid, isophthalic acid, terephthalic acid, adipic acid, fumaric acids, itaconic acid, trimellitic acid, and the corresponding anhydrides.

Polyethers for being used in the binder of the coating composition of the present invention preferably are polyether polyols, in general having a degree of ethoxylation of from 10 to 20, the degree of ethoxylation indicating the number of moles of ethylene oxide that have on average been added onto 1 mole of a polyhydric alcohol, used as the starter molecule in accordance with well-known methods.

Besides ethylene oxide, minor amounts of propylene oxide may be used for the alkoxylation of the polyhydric alcohol.

The polyurethanes for being used in the binder of the coating composition of the present invention, are hydroxyl functional polyurethanes obtained from reaction of a molar excess of polyols on polyisocyanates, or isocyanate functional polyurethanes obtained from reaction of a molar excess of polyisocyanates on polyols.

Examples of polyisocynates are 1,3-cyclopentane, 1,4-cyclohexane and 1,2-cyclohexane diisocyanate, 4,4'-methylene-bis(cyclohexyl isocyanate) and isophorone diisocyanate (IPDI), 2-methylpentamethylene 1,5-diisocyanate (MPDI), hexamethylene diisocyanate (HDI), trimethylhexamethylene 1,6-diisocyanate (TMDI), in particular 2,2,4- and the 2,4,4 isomer and technical mixtures of both isomers.

Examples of polyols are ethylene glycol, 1,2-propylene glycol, 1,4-butanediol, neopentyl glycol, hexanediol, trimethylolpropane and oligomeric and/or polymeric hydroxy-functional compounds such as for example, polyesters, polyethers, silicon comprising polyols, rubber polyols, polyether-esters, polycarbonates, polyether carbonate polyols and polycarbonate polyesters.

The (meth)acrylate copolymers for being used in the binder of the coating composition of the present invention, preferably are hydroxyl-, carboxyl, epoxy- or isocyanato functionalized and may be obtained from the radical polymerization of (meth)acrylate alkyl ester having from 2 to 26 carbon atoms in the alkyl group, such as for example ethyl(meth)acrylate, propyl(meth)acrylate, n-butyl(meth)acrylate, isobutyl(meth)acrylate and (meth)acrylic monomers comprising an epoxy group such as glycidyl(meth)acrylate, an acid group such as (meth)acrylic acid an hydroxyl group such as hydroxyethyl(meth)acrylic or an isocyanate group such as 1-(1-isocyanato-1-methylethyl)-4-(1-methylethenyl) benzene. The (meth)acrylate copolymers may be converted into ethylenically unsaturated group functionalized (meth)acrylate copolymers for example through reaction of epoxy functional (meth)acrylic copolymer with (meth)acrylic acid.

Vinyl alkanoate copolymers for being used in the binder of the coating composition of the present invention, preferably are hydroxyl or carboxyl functional and may be obtained from the radical copolymerization of vinyl esters of carboxylic acids, vinyl ethers of alcohols, vinyl aromatics, non-aromatic hydrocarbons having at least two conjugated double bonds, C1-08 alkenes, hydroxyalkyl(meth)acrylates or ethylenically unsaturated carboxylic acids, among others.

The (hydrogenated) bisphenol resins, in general are (hydrogenated) bisphenol-A or (hydrogenated) bisphenol-F epoxies; the novolac resins are novolac epoxies.

Vinyl ester resins preferably are obtained from reaction of (meth)acrylic acid with epoxy resins or from reaction of hydroxalkyl(meth)acrylate with a carboxyl functional polyester or acrylic copolymer.

Epoxy ester resins preferably are obtained from reaction of fatty acids with epoxy resins.

Alkyd resins for being used in the binder of the coating composition of the present invention are obtained from the condensation of a polyol such as glycerol, a polyacid or its anhydride, such as phthalic anhydride, and a monoacid such as linolenic acid.

Compounds, generally called crosslinker, comprising functional groups reactable with the hydroxyl functional groups of the hydroxyl functional polyesters, polyethers, polyurethanes, acrylic copolymers, vinyl ester resins and alkyds preferably are polyisocyanates, aminoplasts or carbodiimides.

Examples of suitable isocyanate crosslinkers are hexamethylene diisocyanate, isophorone diisocyanate, 4,4'-diisocyanato-dicyclohexylmethane, tetramethylene diisocyanate, 2-methylpentamethylene diisocyanate, 2,2,4- and 2,4,4-trimethylhexamethylene diisocyanate, 1,4-di isocyanato-cyclohexane, 3-isocyanatomethyl-1-methyl-1-isocyanato-cyclohexane, tetramethyl-m- or p-xylylene diisocyanate, 1,4- and 1,3-xylylene diisocyanate, hexahydroxylylene diisocyanate) and mixtures thereof. The polyisocyanates based on hexamethylene diisocyanate, isophorone diisocyanate and 4,4'-diisocyanatodicyclohexyl-methane.

Examples of suitable aminoplasts are partially or substantially methylolated urea-formaldehyde and melamine-formaldehyde. Preferably, highly methylolated melamine, such as hexamethoxymethyl melamine is used.

The carbodiimide crosslinker preferably consists of a condensate through decarboxylation reaction between one or more isocyanates wherein the condensate may be blocked with a hydrophilic group at terminal isocyanate groups thereof.

Crosslinkers for the carboxyl functional polyesters, acrylic copolymers and vinyl ester resins, preferably are epoxy functional group comprising compounds such as bisphenol A or F type epoxy resins, epoxy novolac resins and glycidyl group comprising acrylic copolymers.

Crosslinkers for the bisphenol A or F type epoxy resins, epoxy novolac resins, glycidyl group comprising acrylic copolymers and epoxy ester resins preferably are amine-based curing agents such as aliphatic polyamines, polyamine adducts, polyamide/amidoamines, aromatic amines, ketimines and cycloaliphatic amines or polycarboxylic acid-based curing agents, such as 2,3,5-hexanetricarboxylic acid.

Crosslinkers for the isocyanate functional polyurethanes and acrylic copolymers are polyols such as glycerol, or trimethylol propane and water (moisture curable).

Alkyd resins and the epoxy ester resins may react with oxygen in order to become crosslinked.

Vinyl ester resins, ethylenically unsaturated group functionalized (meth)acrylate copolymers and unsaturated polyesters may be crosslinked via a radical mechanism by adding peroxides such as tertiary-butyl peroxy-3,5,5-trimethyl-hexanoate, di-tertiary-butyl peroxide, benzoyl peroxide, tertiary-butyl perbenzoate, di-2-ethylhexyl peroxydicarbonate, tertiary-butyl hydroperoxide and accelerator such as cobalt octoate to the coating composition.

Dependent on the reactivity of the binder, said binder is supplied as a 1K or 2-K system; in a 2-K system the co-reactable compounds of the binder are admixed just before its application such as may for example be the case for polyurethane and epoxy coating compositions.

The microscale particles for being used in the curable coating composition of the present invention include glass spheres, plastic particles such as polyamide or polytetrafluorethylene particles, silicon carbide, metal oxides, or salts thereof. Non-limiting examples of suitable metal oxides include silicon oxide, aluminum oxide, tin oxide, zinc oxide, bismuth oxide, titanium oxide, zirconium oxide, lanthanide ("rare-earth") oxides, mixtures thereof, and the like; other suitable metal salts such as calcium carbonate, calcium aluminate, magnesium aluminosilicate, potassium titanate, cerium ortho-phosphate, hydrated aluminum silicate, metal salt clays such as montmorillonite, illite, kaolin clay, halloysite, mixtures thereof, and the like; and mixtures of metal oxides with metal salts.

The term "micro-scale particles" refers to particles having a volume median particle diameter (D50) comprised between 1 and 50 μm, preferably between 3 and 35 μm, more preferably between 5 and 20 μm.

The micro-scale particles may be used in combination with one or more nano-scale particles. The term "nano-scale particles" refers to particles having a volume median particle diameter (D50) of about 1 to about 100 nm.

The volume median particle diameter (D50) in general is measured by laser light scattering using the particle size analyzer (HORIBA 920) from (Horiba Scientific) according to ISO 13320.

The micro-scale particle particles preferably used in the coating compositions of the present invention are micro glass spheres optionally in combination with fumed silica nano-scale particles.

The micro-scale particles for being used in the present invention preferably comprise a coating selected from the group consisting of ester-, vinyl ester-, amide-, urethane-, (meth)acrylate- and epoxy-based coatings.

The average particle size is related to the layer thickness of the cured coating and is comprised between 0.02 and 500%, preferably between 0.04 and 350%, more preferably between 0.06 and 200% and most preferably between 0.08 and 100% of the coating layer thickness surrounding the particles.

Without being bound by any theory, the inventor is of the opinion that blocking of said micro-scale particles at the surface of said top-layer, upon curing, contributes to the anti-slip properties.

The coating composition of the present invention further comprises one or more compounds selected from the group consisting of silicones, fluorocarbons, fluorinated silicones, olefin (co)polymers, natural waxes and synthetic waxes.

The fluorinated compound for being used in the curable coating composition of the present invention preferably is a polymer obtained from the polymerization of one or more fluorinated ethylenically unsaturated monomers wherein fluorine is derived from at least one substituent such as a (per)fluorinated linear or branched alkyl-substituent, a (per) fluorinated linear or branched alkylene-substituent and/or a (per)fluorinated (poly)alkyleneoxy-substituent and optionally one or more non-fluorinated ethylenically unsaturated monomers comprising substituents such as for example (poly)alkyleneoxy, hydroxyalkyl, carboxyl, amine, quaternary amine, sulfonate, sulfate, carboxylate, phosphate, phosphonate, alkylalkoxylate or aminocarboxylate substituents.

Alternatively the fluorinated compound may comprise a fluorinated tail selected from the group consisting of (per) fluorinated polyoxyalkylene; poly-1,1-difluoroethylene; copolymers of tetrafluoroethylene and hexafluoropropylene; terpolymers of hexafluoropropylene, tetrafluoroethylene, and ethylene; and terpolymers of tetrafluoroethylene, hexafluoropropylene and 1,1-difluorethylene, and a non-fluorinated head such as for example a polyoxyalkylene, hydroxyalkyl, carboxyl, amine, quaternary amine, sulfonate, sulfate, carboxylate, phosphate, phosphonate, alkylalkoxylate or aminocarboxylate comprising head group.

Optionally the fluorinated compounds comprise a linking group between the fluorinated portion and the non-fluorinated portion such as for example alkylene, arylene, sulfonamidoalkylene, carbonamidoalkylene, oxydialkylene, thiodialkylene or alkylenecarbama-to.

The silicones for being used in the curable coating composition of the present invention are preferably straight chain, cyclic, branched, dendritic, or network polysiloxane (s). Straight chain or a partially branched straight chain polysiloxanes are particularly preferred.

Unsubstituted monovalent hydrocarbyl groups and substituted monovalent hydrocarbyl groups are examples of the silicon-bonded organic groups.

The unsubstituted monovalent hydrocarbyl can be exemplified by C1-10 alkyl such as methyl, ethyl, n-propyl, isopropyl, butyl, t-butyl, hexyl, octyl, decyl; C3-10 cycloalkyl such as cyclopentyl, cyclohexyl; C2-10 alkenyl such as vinyl, allyl, 5-hexenyl, 9-decenyl; C6-10 aryl such as phenyl, tolyl, xylyl; and C7-10 aralkyl such as benzyl, methylbenzyl, phenethyl.

Preferred there among are the C1-10 alkyl, C6-10 aryl, and C2-10 alkenyl, wherein methyl and phenyl are particularly preferred.

The substituted monovalent hydrocarbyl group can be exemplified by groups provided by replacing all or a portion of the hydrogen atoms in the aforementioned unsubstituted monovalent hydrocarbyl groups, and particularly in the C1-10 alkyl and phenyl, with a halogen atom, an epoxy functional group, a (meth)acrylic functional group, an amino functional group, a sulfur-containing functional group or a substituent group such as alkoxy, hydroxycarbonyl and alkoxycarbonyl.

Preferred polysiloxanes include polymers and copolymers comprising dimethylsiloxane units, methylhydrogensiloxane units, diphenylsiloxane units, phenylmethylsiloxane units, dimethylhydrogensiloxane units and trimethylsiloxane units.

Polysiloxanes with pendant fluorinated groups may be used as well.

The hydrocarbon compound for being used in the curable coating composition of the present invention may be a homopolymers of ethylene or propylene, or a copolymer of ethylene with one or more 1-olefins, in particular propylene. 1-Olefins used are linear or branched olefins having 2-18 carbon atoms, preferably 3-6 carbon atoms. The 1-olefins may carry an aromatic substitution. Examples of these 1-olefins are ethylene, propylene, 1-butene, 1-hexene, 1-octene and 1-octadecene, and also styrene. Preference is given to homopolymers of ethylene or propylene or copolymers of ethylene with propylene or 1-butene.

The hydrocarbon may be a functionalized polyolefin, a functionalized vinyl aromatic polymer or a functionalized copolymer of one or more vinyl aromatic monomers and one or more alkene or alkadiene such as for example polyethylene, polypropylene, polystyrene or poly(ethylene-styrene) random copolymer, preferably comprising a terminal functional group such as a hydroxyl, a carboxyl, an amine, a quaternary ammonium, an anhydride, an imidazolinium, sulfonium or a phosphonium group.

Polar polyolefin may be obtained by oxidizing an ethylene or propylene homopolymer or copolymer or grafting them, for example with maleic anhydride.

Further natural or synthetic waxes for being used in the curable coating composition of the present invention may comprise:
  amide waxes preparable by reacting ammonia or ethylenediamine with stearic acid, tallow fatty acid, palmitic acid or erucic acid;
  montan waxes, including acid waxes and ester waxes having a carbon chain length of the carboxylic acid of from C22 to C36;
  ester waxes, preferably reaction products of the montanic acids with monohydric or polyhydric alcohols having 2 to 6 carbon atoms, such as ethanediol, 1,3-butanediol or 1,2,3-propanetriol, for example;
  carnauba wax;
  the reaction products of sorbitol with stearic acid, tallow fatty acid, palmitic acid or erucic acid;
  Fischer-Tropsch waxes;
  paraffins and microcrystalline waxes.

The coating composition of the present invention preferably comprises 5 and 30% by weight, more preferably 10 and 25% by weight of further additives such as adhesion promotors, dispersing agents, flow aid agents, thickening agents, defoaming agents, deaerating agents, pigments, fillers, flattening agents, matting agents and wetting agents.

The adhesion promotor is preferably an acidic adhesion promotor generally comprising one or more acid functionality selected from the group consisting of —$SO_3H$, —$OSO_3H$, —COOH, —$OPO_3H_2$ and —$OPO_2HO$—. Optionally the acidic hydrogen is substituted by an alkali metal or an ammonium base.

Examples are polyesters and polyurethanes comprising one or more —$SO_3H$, —$OSO_3H$, —COOH, —$OPO_3H_2$ and —$OPO_2HO$— functionality through incorporation of polybasic acids or polyols such as 5-sulfoisophthalic acid, 2-sulfoisophthalic acid, 4-sulfophthalic acid, 3-sulfophthalic acid, a dialkyl 5-sulfoisophthalate, a dialkyl 2-sulfophthalate, an alkyl 4-sulfophthalic acid, an alkyl 3-sulfophthalic acid, dimethylolpropionic acid and a sodium, potassium or ammonium salt of these compounds.

Another example of a carboxylic acid comprising adhesion promotor may be obtained from combining any monomeric, dimeric, oligomeric or polymeric saturated or unsaturated, aromatic, aliphatic, cycloaliphatic and heterocyclic compounds containing the epoxide group and one or more alicylic, aliphatic, cycloaliphatic, aromatic and polyanhydrides.

The coating composition of the present invention preferably comprises 0.2 to 2% by weight, more preferably between 0.5 and 1.5% by weight of one or more adhesion promotor(s), preferably acidic adhesion promotor(s).

The present invention provides a method for the preparation of said decorative surface coverings.

The method comprises the following steps:
  step 1): providing one or more layer(s) preferably comprising one or more olefin (co)polymers and/or one or more vinyl halide (co)polymers,
  step 2): applying and curing one or more coating composition(s).

In said method, step 1) comprises 2 embodiments, whereas step 2) comprises 3 embodiments.

A first embodiment of step 1) comprises providing one or more polyolefin comprising layers. Said one or more polyolefin comprising layers preferably are produced via one or more processing machines comprising a series of calendar rolls, wherein one or more polyolefin comprising paste(s), are processed.

The set temperature of the calendering rolls in general is comprised between 140 and 200° C., preferably between 150 and 190° C., more preferably between 160 and 180° C.

The hot polyolefin comprising paste is prepared by compounding the one or more olefin (co)polymers, the filler(s), the lubricant(s) and the one or more additives in a suitable heated mixer, for example in a twin screw or a single screw extruder, a mixing bowl with heated jacket, a Banbury mixer, continuous mixer, a ribbon mixer or any combination thereof to form a blend.

The polyolefin comprising paste is obtained from melt-mixing at an internal temperature comprised between 180 and 240° C., preferable between 190 and 230° C., more preferable between 200 and 220° C.

A second embodiment of step 1) comprises spreading out at least one vinyl chloride (co)polymer comprising plastisol on a backing layer and gelling said at least one plastisol layer at a temperature comprised between 130° C. and 200° C. Hereto, the at least one vinyl chloride (co)polymer comprising plastisol is spread on a backing layer moving at around 15 to 25 meters per minute.

For multilayer decorative surface coverings at least one vinyl chloride (co)polymer comprising plastisol is spread on the backing layer in several layers so that the floor covering is literally built up.

The multilayer product is first gelled by contact with one or more heated roll and then passed into an oven where they are gelled and fused at a temperature of from 130° C. to 200° C.

Often the gelling is performed after the spreading of each individual layer starting with the base layer. After the gelling the next layer can be spread.

Typically vinyl chloride (co)polymer comprising plastisols are produced in batch processes using high shear mixing equipment. The mixing generally is performed for a period of from about 15 to about 60 minutes, whereupon the blend is cooled down. In general such process is used for making plastisols which are immediately further processed, since the high friction level of the mixing elements in the plastisol results in high local temperature increase which generally results in poor viscosity stability of the plastisol on storage.

On the other hand, storage stable plastisols can be prepared by blending the finely divided vinyl chloride (co)polymer, optionally other finely divided solid materials, liquid plasticizer blend and optionally other liquid materials in a blending tank with low shear. The pre-homogenized plastisol is recirculated from the blending tank through a dynamic mixer back into the blending tank. This recirculation is performed up to 10 times prior to discharging the final plastisol.

The vinyl chloride (co)polymer comprising plastisol may be phthalate-free plastisol.

The vinyl chloride (co)polymer comprising plastisol may be a phthalate-free polyvinyl chloride comprising plastisol.

To the top-surface of the one or more layers of step 1), standing at a temperature comprised between 25 and 60° C., preferably between 30 and 50° C., the one or more coating compositions of the present invention, is (are) applied in step 2).

For the preparation of the coating compositions the binder is mixed with one or more components selected from the group consisting of micro-scale particle (ii), compounds (iii) and additives such as adhesion promotors, dispersing agents, flow aid agents, thickening agents, defoaming agents, deaerating agents, pigments, fillers, flattening agents, matting agents and wetting agents. Mixing can be carried out simply by stirring.

A first embodiment of step 2) comprises:
  applying a first coating composition, comprising binder (i) and one or more compounds (iii), on the surface of the one or more polymer layer(s),
  curing the first coating composition to form the first layer,
  applying a second coating composition, comprising binder (i) and micro-scale particles (ii), on the surface of the first layer, according to a pattern of covered and uncovered areas,
  curing the second coating composition to form a cured top-layer, comprising the cured first layer with the cured patterned second layer atop;

In this first embodiment of step 2), the first coating composition may not be fully cured before the patterned application of the second coating composition. For example, curing of the first coating composition may be limited to a degree of at least 5%, preferably at least 10%, more preferably at least 20% and most preferably at least 40%.

In a particular variant of the first embodiment of step 2), the first coating composition is not cured before the patterned application of the second coating composition.

A second embodiment of step 2) comprises:
  patterned applying the first and the second coating composition on the surface of the one or more polymer layer(s),
  curing the first and the second coating composition to form a cured top-layer, comprising patterned cured first layer and patterned cured second layer;

A particular variant of the second embodiment of step 2) comprises:
applying the first coating composition on the surface of the one or more polymer layer(s), according to a pattern of covered and uncovered zones
optionally curing the first coating composition to form a patterned first layer,
applying the second coating composition on these parts of surface of the one or more polymer layer(s) that do not comprise the patterned first layer,
curing the first and the second coating composition to form a top-layer comprising patterned cured first layer and patterned cured second layer.

A third and preferred embodiment of step 2) comprises:
applying coating composition, comprising binder (i), micro-scale particles (ii) and one or more compounds (iii), on the surface of the one or more polymer layer(s),
curing the coating composition to form a cured top-layer.

The coating compositions of the present invention may be applied by any suitable coating process known to those of ordinary skill in the art, for example by direct gravure coating, reverse gravure coating, offset gravure coating, smooth roll coating, curtain coating, spray coating and combinations thereof. Direct gravure coating and smooth roll coating are preferred.

Curing may be performed at a temperature comprised between 20 and 250° C., preferably between 60 and 220° C., more preferably between 100 and 190° C. Curing is performed either under ambient conditions or through convection heat. Preferably curing is performed by infrared irradiation, The infrared emitter preferably is adapted to have peak emission at a wavelength of between about 1.5 µm and about 8 µm, or between about 2.0 µm and about 5 µm. Curing preferably is performed by using a combination of short and medium infrared emitters.

The one or more layer(s) of the surface covering of the present invention may be chemically or mechanically embossed either over the entire surface of the surface covering or according to (a) pattern(s). Embossing may be performed either before application of the coating composition or before the curing of the coating composition.

Mechanical embossing is performed by pressing a texture into the plasticized polyvinyl chloride layer. Embossing is carried out at a pressure comprised between 10 and 25 kg·cm$^{-2}$ and surface temperature comprised between 130° C. and 200° C.

The apparatus for mechanically embossing a substrate in general includes a cooled embossing roller and a backup roller operatively positioned within the embossing roller such that a nip is formed between the backup roller and the embossing roller whereby the substrate may pass through the nip and engage the embossing roller for imparting a mechanically embossed pattern. The apparatus further includes a profilometer capable of quantifying the mechanically embossed pattern as the substrate is being embossed.

In general the texture obtained from mechanical embossing is characterized by a depth comprised between about 10 to 100 µm, a width comprised between about 125 to 400 µm, a wall angle (angle relative to surface) comprised between about 5 to 40 degrees and a frequency of about 4 to 20 features per cm.

In chemical embossing the surface texture is developed by chemically reacting an ink that forms the decorative motif with an agent added to a sub-surface layer.

Alternatively the upper layer may be provided with a granulate that can generate chemical embossing. A substance that inhibits foaming when the granulate is heated, may be mixed into the granulate. The pattern of the foaming agent or inhibitor determines the foamed/non-foamed zones, the distribution pattern can be random or predetermined.

For the particular embodiment wherein the one or more layer(s) of the surface covering are patterned embossed, the complete surface or the non-embossed regions are covered with the first coating composition, while the embossed regions are covered with the second coating composition or by a coating composition substantially free of micro-scale particles (ii) and compounds (iii)

In general the thickness of the top coat is comprised between 3 and 40 microns, preferable between 5 and 30 microns more preferably between 8 and 20 microns.

In a particular embodiment of the present invention, the top surface of the one or more layers is subjected to a plasma treatment, preferably a corona treatment, adjusted to provide a surface energy of at least 38 mN/m, preferably of at least 40 mN/m, more of at least 42 mN/m, according to ASTM D2578.

Corona treatment is of particular interest for the one or more layers comprising one or more olefin (co)polymers.

Corona plasma treatment ideally is done on-line immediately before application of the coating composition.

EXAMPLES

The following illustrative examples are merely meant to exemplify the present invention but are not destined to limit or otherwise define the scope of the present invention.

Example 1. Phthalate-Free PVC Plastisol and Multi-Layer Substrate

A phthalate-free PVC plastisol, as in table 1, was prepared using any convenient method known to the one skilled in the art. The finely divided PVC polymer and other finely divided solid materials were dispersed in the liquid plasticizer blend forming a paste. On heating the dispersion to a temperature above 100° C., the polymer became soluble in the plasticizer whereupon the two phase dispersion was transformed into a single phase system.

The PVC plastisol was produced using high shear mixing equipment. The mixing was performed for a period of 35 minutes, whereupon the blend was cooled down.

TABLE 1

|  | Component | Plastisol |
| --- | --- | --- |
| PVC | Paste PVC micro-suspension | 70.00 |
|  | Paste PVC resin extender | 30.00 |
| Primary plasticizer | Diisononyl cyclohexanoate | 16.00 |
| Secondarry plasticizer | Isononyl benzoate | 7.00 |
| Diluent | Branched paraffin | 5.00 |
| Stabilizers | Liquid Ca/Zn | 2.00 |
|  | Epoxydized soya bean oil | 2.50 |
| Other component | Air release | 0.60 |

In table 1: the PVC resin micro-suspension is a blend of 60.00 parts of Lacovyl® PB 1704 H and 10 parts of Lacovyl® PB 1202 from Arkema; the paste PVC resin extender is Vinnolit® EXT from Vinnolit; diisononyl cyclohexane is Hexamoll® DINCH from BASF; isononyl benzoate is Vestinol® INB from Evonik; the branched paraffin, including normal alkanes, isoalkanes and cyclics, is EXXSOM™ D100 from Exxon Mobil; liquid Ca/Zn stabilizer is Lankromark® LZC 393 from Akcros; epoxidized soya bean oil is Drapex® HSE from Galata Chemicals and air release additive is Byk® 3160 from Byk Chemie.

The PVC surface covering was prepared by spreading the plastisol, according to the formulation as given in table 2, on the backing layer in 4 layers so that the floor covering is literally built up.

The multilayer product is first gelled by contact with one or more heated roll and then passed into an oven where they are gelled and fused at a temperature of from 130° C. to 200° C.

Typically vinyl chloride (co)polymer comprising plastisols are produced in batch processes using high shear mixing equipment. The mixing was performed for a period of 30 minutes, whereupon the blend is cooled down. In general such process is used for making plastisols which are immediately further processed, since the high friction level of the mixing elements in the plastisol results in high local temperature increase which generally results in poor viscosity stability of the plastisol on storage.

Example 2. Solvent Based Thermal Curable Coating Composition

TABLE 2

| Component | % by weight (apart from solvent) |
| --- | --- |
| Polyol | 48.5 |
| Polyisocyanate | 39.5 |
| Solvent | 130.0 |
| Catalyst | 0.5 |
| Anti-slip | 8.8 |
| Anti-scuff | 2.7 |

In table 2: polyol is a 3/1 mixture of Arcol® LHT-240 and Arcol® LHT-112 (polypropylene oxide polyol) from Covestro; polyisocyanate is Vestanat® H12MDI (4,4'-diisocyanato dicyclohexylmethane) from Evonik; catalyst is Fomrez™ UL-28 (dimethyltin dineodecanoate) from Witco; anti-slip additive is Microperl® 050-20-217 (polyester and vinyl ester coated glass bead made from soda lime glass with a volume median particle size of 20 μm) from Solvitec; anti-scuff agent is fluorocarbon FC-430 (fluorocarbon alkyl esters) from 3M and solvent is a 1/2/1 mixture of ethyl acetate/methyl cyclohexane/methyl ethyl ketone.

The components of table 2, apart from the polyisocyanate, were charged to a stirred, nitrogen-purged glass reactor and heated to 70° C. for one hour. The polyisocyanate subsequently was added dropwise over a 30 minute period of time at a rate sufficient to maintain the temperature of the mixture at 70° C. After an additional two hour period of stirring and heating at 70° C., the product was cooled and roll coated onto the polyvinylchloride multilayer substrate of example 1. The coated structure was oven heated at 110° C. for five minutes to provide a 15 μm thick coating.

Example 3. High Solid Thermal Curable Coating Composition

TABLE 3

| Component | % by weight (apart from solvent) |
| --- | --- |
| Epoxy resin | 62.1 |
| Amine crosslinker | 18.4 |

TABLE 3-continued

| Component | % by weight (apart from solvent) |
| --- | --- |
| Anti-slip | 11.7 |
| Anti-scuff | 7.8 |
| Solvent | 15.0 |

Epoxy resin is a 9/1 mixture of Adeka EP-4080E (cycloaliphatic epoxy resin) from Adeka Corporation and Heloxy 505 (polyepoxide resin) from Hexion; amine crosslinker is Versamid 140 from BASP; anti-slip additive is Microperl® 050-20-217 (polyester and vinyl ester coated glass bead made from soda lime glass with a volume median particle size of 20 μm) from Solvitec; anti-scuff agent is a 3/2 mixture of DC-3074 (amine group comprising polysiloxane) from Dow Corning and Necires EPX L2 (hydroxyl-group comprising hydrocarbon resin) from Nevcin Polymers; solvent is n-butanol.

The components of table 3, were charged to a nitrogen-purged glass reactor and stirred at 71° C. for 30 minutes. The product then was cooled and roll coated onto the polyvinylchloride multilayer substrate of example 1.

The coated structure was oven heated at 140° C. for 3 minutes to provide a 20 μm thick coating.

Example 4. High Solid Thermal Curable Coating Composition

An alkyd resin with hydroxyl number of 120 mg KOH/g was prepared from reacting 13.2 parts of pentaerythritol, 6.6 parts of trimethylol propane and 3.5 parts of glycerol with 30.8 parts of soybean oil, 7.6 parts of castor oil, 29.8 parts of phthalic anhydride and 8.5 parts of benzoic.

The condensation is performed at 200° C. and vacuum is applied until an acid number below 5 mg KOH/g is obtained.

The alkyd resin then acid was formulated in a coating formulation according to the composition as in table 4.

TABLE 4

| Component | % by weight (apart from solvent) |
| --- | --- |
| Alkyd resin | 58.4 |
| Crosslinker | 25.6 |
| Anti-slip | 8.8 |
| Anti-scuff | 7.2 |
| Solvent | 35.0 |

In table 4: crosslinker is Desmodur L 75 (toluene diisocyanate) from Covestro; anti-slip additive is Microperl® 050-20-217 (polyester and vinyl ester coated glass bead made from soda lime glass with a volume median particle size of 20 μm); anti-scuff agent is Byk 333 (polydimethylsiloxane) from Byk; solvent is isoamyl acetate.

The components of table 4, were charged to a nitrogen-purged glass reactor and stirred 10 for 1 hour. The product then was cooled and roll coated onto the polyvinylchloride multilayer substrate of example 1.

The coated structure was oven heated at 170° C. for 3 minutes to provide a 20 μm thick coating.

Example 5. Coating Evaluation

The coatings of example 2 to 4 were applied onto the multilayer substrate of example 1, immediately after corona treatment of the top-surface of the top-layer of said substrate.

Before Corona treatment the multilayer substrate was mechanically embossed at a pressure of about 15 kg·cm$^{-2}$ while standing at a temperature of about 160° C.

After cooling multilayer substrate, the top surface of the top layer was corona treated for 1 second, using a Corona Lab System from Dyne Technology Ltd., whereupon the surface energy increased from 36 mN/m to 41 mN/m.

The anti-slip properties of the decorative surface covering of the present invention were assessed according to DIN 51130, "Testing of floor coverings—Determination of the anti-slip property—Workrooms and fields of activities with slip danger, walking method—Ramp test".

In this method a test person with test shoes walks forwards and backwards in an upright position over the floor covering to be tested, the slope of which is increased from the initial horizontal state to the acceptance angle (=angle of inclination until the limit of safe walking is reached and the test person slips). The acceptance angle is determined on floor coverings on which a lubricant has been applied.

For this test method the below evaluation criteria apply:

| Resistance class | Acceptance angle in ° |
|---|---|
| R9 | 6 to 10 |
| R10 | 11 to 19 |
| R11 | 20 to 27 |
| R12 | 28 to 35 |
| R13 | Over 35 |

For the decorative surface covering comprising the cured coating compositions of example 2 to 4, a resistance class equal to or superior to R9 was recorded.

The scuff resistance is assessed using a friction test apparatus wherein an Astral rubber tool with thickness of 5 mm and a width of 0.8 mm, while subjected to a loading of "Y" kg is moved "X" times over 25 cm over the test area at a speed of 0.40 m/s.

In the test the rubber tool, before touching the test panel (39×39 cm) is moved over 2 cm of abrasive paper (P600)

The complete test consists of:

| "X" | "Y" |
|---|---|
| 6 | 9 |
| 4 | 7 |
| 2 | 5 |
| 1 | 4 |
| 1 | 3 |

After each test series (for example 6 times with a 9 kg loading) the test panel is visually evaluated, without cleaning, on a 0 to 3 scale where:
0 results in severe damage (top-layer is teared off, scuff is irreversible);
1 results in damage (marks clearly visible);
2 results in slight damage (marks slightly visible);
3 results in no visual damage (no marks at all);
wherein damage, in the present invention reflects the intensity of the marks left by the rubber Finally the test result of the respective series are added together for a final result comprised between 0 and 15.

Figure 2:
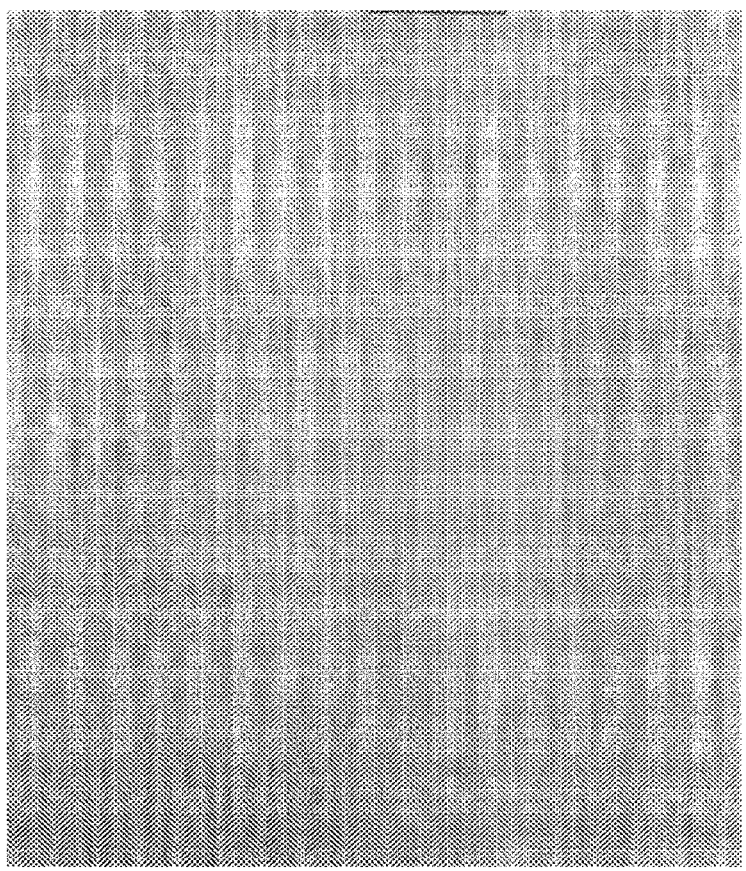
FIG. 2 illustrates the scuff resistance test on a decorative surface according to the present invention.

In FIG. 1 the scuff test is illustrated for a decorative surface covering of the state of the art; in FIG. 2 the same scuff test is illustrated for a decorative surface covering according to the invention. The test results are reproduced without cleaning before and after the scuff test.

In FIG. 1 the leftmost mark corresponds to conditions as disclosed in the bottom row of the above table. The rightmost mark corresponds to conditions as disclosed in the top row of the above table. The marks in between correspond, going from left (second mark) to right (fourth mark), to the conditions as disclosed in rows 4, 3 and 2 respectively. As appears from FIG. 2, the marks are barely or even not visible for the decorative surface covering of the invention.

For the decorative surface covering, comprising the cured coating compositions of example 2 to 4, a final scuff resistance of 13, 12 and 12 was recorded respectively; the value for the final scuff resistance was obtained from:

| | | Test result | | |
|---|---|---|---|---|
| "X" | "Y" | Ex. 2 | Ex. 3 | Ex. 4 |
| 6 | 9 | 2 | 2 | 2 |
| 4 | 7 | 2 | 2 | 2 |
| 2 | 5 | 3 | 2 | 2 |
| 1 | 4 | 3 | 3 | 3 |
| 1 | 3 | 3 | 3 | 3 |

The respective evaluations in the above table and the final scuff resistance value is the average of 3 measurements.

The invention claimed is:

1. A decorative surface covering comprising a substrate having a top surface and a top-layer covering the top surface of said substrate, said top-layer comprising:
   40 to 80% by weight of a thermally cured binder (i) comprising a polymer selected from the group consisting of epoxy resin, epoxy ester resin, vinyl ester resin, polyester, alkyd resin, polyamide, polyesteramide, polyurethane, polyether, (meth)acrylate (co)polymer, vinyl (co)polymer, aminoplast resin and mixtures thereof;
   0.5 to 25% by weight of one or more types of micro-scale particle(s) (ii) with a volume median particle diameter (D50) comprised between 1 and 50 μm as obtained from laser light scattering measurements according to ISO 13320; and
   0.1 to 20% by weight of one or more compounds (iii) selected from the group consisting of silicones, fluorocarbons, fluorinated silicones, olefin (co)polymers, natural waxes and synthetic waxes;
   wherein said decorative surface covering having a Slip Resistance, according to DIN 51130, corresponding to Slip Resistance Class equal to or superior to R9 and a Scuff Resistance of 8 or higher as assessed in a friction test apparatus with an Astral Rubber tool, with a thickness of 5 mm and a width of 0.8 mm, moving 1, 1, 2, 4 and 6 times with a loading of 3, 4, 5, 7 and 9 kg respectively over a 25 cm distance of a test panel at a speed of 0.40 m/s.

2. The decorative surface covering according to claim 1, wherein the substrate comprises one or more layer(s) selected from the group consisting of polymer, natural wood, engineered wood, natural stone, agglomerated stone, and ceramic.

3. The decorative surface covering according to claim 1, wherein the substrate comprises one or more polymer layer(s) comprising polymers selected from the group consisting of polyvinyl halides, polyolefins and block copolymers comprising polymer blocks of one or more vinyl aromatic monomer(s) and polymer blocks of one or more alkylene(s).

4. The decorative surface covering according to claim 1, wherein the top-layer is patterned with patterns comprising micro-scale particles (ii) and patterns comprising compounds (iii).

5. The decorative surface covering according to claim 1, wherein the types of one or more micro-scale particles (ii) are selected from the group consisting of glass particles, plastic particles, metal oxide particles, metalloid oxide particles and metal salt particles and mixings thereof.

6. The decorative surface covering according to claim 1, wherein the volume median particle diameter (D50) of the micro-scale particles (ii) is comprised between 1/50 and 5 of the cured top-layer thickness.

7. The decorative surface coverings according to claim 1, wherein the top-layer comprises acid functionalities selected from the group consisting of —$SO_3H$, —$OSO_3H$, —COOH, —$OPO_3H_2$ and —$OPO_2HO$—.

8. The surface covering according to claim 1, comprising at least one of a chemically or mechanically embossed textured and patterned structure.

9. The surface covering according to claim 1, comprising a patterned embossed structure wherein both the embossed and non-embossed regions or only the non-embossed regions are covered with a top-layer comprising one or more compounds (iii); the embossed regions being covered with a top-layer comprising micro-scale particles (ii).

10. The surface covering according to claim 1, comprising a top-layer comprising:
   40 to 80% by weight of a cured binder comprising a polymer selected from the group consisting of polyurethane and epoxy resin;
   0.5 to 25% by weight of micro glass spheres; and
   0.1 to 20% by weight of polysiloxane.

11. Method for the preparation of the decorative surface covering comprising the steps of:
   providing a substrate having a top surface and comprising one or more layer(s);
   applying at least one coating composition, as a continuous layer or according to overlapping or non-overlapping patterns, and covering the top surface of the one or more layers, said coating composition being selected from the group consisting of a coating composition comprising binder (i) and micro-scale particles (ii), a coating composition comprising binder (i) and one or more compounds (iii) other than binder (i) and a mixture thereof; and
   curing the coating composition(s);
   wherein a decorative surface covering as claimed in claim 1 is obtained.

12. The method according to claim 11, wherein the coating composition is selected from the group consisting of solvent based, water-borne and high solid compositions, the binder of each of said coating compositions being a one- or two- component binder system, said coating compositions being selected from the group consisting of coating compositions comprising, with respect to the non-volatile components,
   40 to 80% by weight of binder (i) and 0.5 to 25% by weight of one or more micro-scale particle(s) (ii);
   40 to 80% by weight of binder (i), and 0.1 to 20% by weight of one or more compounds (iii); and
   40 to 80% by weight of binder (i), 0.5 to 25% by weight of one or more micro-scale particle(s) (ii) and 0.1 to 20% by weight of one or more compounds (iii).

13. The method according to claim 11, comprising the additional step of mechanical embossing the one or more layer(s) before application of the one or more coating composition(s) or before curing of the one or more coating application(s).

14. The method according to claim 11 comprising the additional step of subjecting the top surface of the one or more layer(s) to a plasma treatment before application of the one or more coating composition(s).

15. The method according to claim 11 wherein curing of the coating composition is performed by infrared irradiation.

16. The decorative surface covering according to claim 1, wherein the decorative surface covering is a decorative floor or wall covering.

* * * * *